US007280912B2

(12) United States Patent
Thompson et al.

(10) Patent No.: US 7,280,912 B2
(45) Date of Patent: Oct. 9, 2007

(54) CONTROLLER AND CONTROL METHOD FOR AN ENGINE CONTROL UNIT

(75) Inventors: Jeffrey John Thompson, Vancouver (CA); Abdolreza Fallahi, Pinner (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/543,603

(22) Filed: Oct. 5, 2006

(65) Prior Publication Data

US 2007/0078588 A1 Apr. 5, 2007

(30) Foreign Application Priority Data

Oct. 5, 2005 (EP) .................................. 05256221

(51) Int. Cl.
*G06F 19/00* (2006.01)
*G01L 23/22* (2006.01)

(52) U.S. Cl. ...................................... 701/114; 73/35.03

(58) Field of Classification Search ................ 701/101, 701/103, 108, 114, 115; 123/339.1, 436, 123/674; 73/35.03, 35.09, 116, 118.02
See application file for complete search history.

(56) References Cited

U.S. PATENT DOCUMENTS

| | | | | |
|---|---|---|---|---|
| 4,763,627 | A | 8/1988 | Tomisawa et al. | |
| 6,298,835 | B1 * | 10/2001 | Horie et al. | 123/568.21 |
| 6,550,465 | B2 * | 4/2003 | Ueno et al. | 123/679 |
| 6,760,659 | B1 * | 7/2004 | Cowen | 701/113 |
| 2004/0173166 | A1 * | 9/2004 | Kobayashi et al. | 123/21 |

FOREIGN PATENT DOCUMENTS

| | | |
|---|---|---|
| EP | 0943790 | 9/1999 |
| EP | 1344921 | 9/2003 |
| WO | 2004/027240 | 4/2004 |

* cited by examiner

*Primary Examiner*—John T. Kwon
(74) *Attorney, Agent, or Firm*—David P. Wood

(57) ABSTRACT

A method for controlling operation of an electronic control unit for use in an internal combustion engine, the electronic control unit being used to control different engine modes, the method including providing a function mode map having a plurality of data map points wherein the function mode map is divided into at least a first type region containing data map points representing mode map output values only of a first mode type and a second type region containing data map points representing mode map output values only of a second mode type; and providing at least one further data map having a plurality of further data map points, each of the further map points representing a further data map output value. The method also includes determining a current mode for an operating point on an operating path within the function mode map in dependence upon first and second engine operating parameters and determining a control function for the electronic control unit based on the current mode of the operating point and at least one further data map output value determined from the at least one further data map.

21 Claims, 13 Drawing Sheets

CONTROLLER AND CONTROL METHOD FOR AN ENGINE CONTROL UNIT

The present invention relates to the field of engine management and in particular relates to electronic control units for controlling functions within an internal combustion engine. The invention relates to a method for controlling operation of an engine control unit for use in an internal combustion engine and also a controller for performing the control method, for example an engine controller and to additionally a carrier medium carrying computer readable code for controlling a processor or computer to carry out said control method.

An electronic control unit may provide control signals to a fuel injector controlling a fuel injection mode or alternatively could control an exhaust gas recirculation unit controlling whether exhaust gas is to be re-circulated as intake air into an engine.

Injectors used in fuel injection systems are generally controlled electrically by means of a current waveform applied to the injector. The properties or shape of the waveform applied to the injectors determines the type of injection performed by the injectors. For example, a first waveform may be arranged to cause the injector to generate a pilot injection followed by a single main injection while a second waveform may be arranged to generate a single main injection with no preceding pilot injection. FIG. 1 shows logic pulse arrangements for eight different types of injection, or modes.

The different injection modes are governed by the engine speed and fuel demand (engine load) of the vehicle. An engine controller or management system will determine which mode should be utilised within the engine load/speed range by reference to one or more maps stored within its memory.

Each map will generally comprise a two dimensional table having x- and y-values representative of the fuel demand and engine speed. An ordinary map can represent continuous lines or surfaces and will comprise a table of output values and a table of values for each input axis. For a given input, the output can be interpolated from these tables.

In the case of a map representing fuel modes the map may be different depending, for example, on whether a pilot injection is enabled or not. Such a map may have regions in which a pilot is enabled and regions in which it is not. Between these regions there will be a discontinuity in which it is not possible to interpolate a “compromise” value.

To avoid instability about the discontinuity (i.e. rapid switching between engine modes) hysteresis must be applied when moving from one side of the discontinuity to the other.

The Applicant’s co-pending European patent application EP 1344921 describes a method for controlling an injector. In the application a “function map” is defined which comprises a “region” map which details the various injection modes to be used dependent on the engine speed and fuel load and one or more data tables that sit below the region map that contain injection data relevant to the associated mode.

Instability about the discontinuity between regions is avoided by determining the position and path of the operating point of the engine. As the operating point moves from one side of the hysteresis region of the region map to the other side of the hysteresis region, injection output is extrapolated from the data table. When the operating point has traversed the hysteresis region then the output is interpolated from the current side of the discontinuity.

A problem with the above described system is the fact that data is extrapolated at certain points within the engine operating envelope. Extrapolation of data is undesirable and in certain circumstances can yield inaccurate or even physically impossible results.

A further problem with the above described system is the fact that the hysteresis region is defined by the map axes. If, for example, the engine speed axis is calibrated in increments of 100 rpm then the hysteresis region will be 100 rpm in the speed axis direction. If a user decides that the hysteresis should actually be 10 rpm then this requires all the data maps associated with the region map to be recalibrated. This can be a time consuming and costly exercise.

The present invention seeks to overcome or substantially mitigate the above mentioned problems.

Accordingly a first aspect of the present invention provides a method for controlling operation of an electronic control unit for use in an internal combustion engine, the electronic control unit being used to control different engine modes, the method including providing a function mode map having a plurality of data map points wherein the function mode map is divided into at least a first type region containing data map points representing mode map output values only of a first mode type and a second type region containing data map points representing mode map output values only of a second mode type;

and providing at least one further data map having a plurality of further data map points, each of the further map points representing a further data map output value;

determining a current mode for an operating point on an operating path within the function mode map in dependence upon first and second engine operating parameters determining a mode value for each of a plurality of hysteresis points within the function mode map in dependence upon the first and second engine operating parameters, the hysteresis points being arranged to surround the operating point and determining a control function for the electronic control unit based on the current mode of the operating point and at least one further data map output value determined from the at least one further data map wherein the operating point is associated with an existing mode and the current mode of the operating point is determined based on the following criteria:

a) if the mode value of each of the plurality of hysteresis points is different to the existing mode of the operating point then setting the current mode of the operating point as equal to the mode value of the region of the function mode map that the operating point is currently located in;

b) if one or more of the mode values of the hysteresis points is equal to the existing mode of the operating point then maintaining the existing mode value as the current mode of the operating point.

The present invention provides a method for controlling the operation of an electronic control unit. The method utilises a “function mode map” which defines, in dependence upon first and second engine operating parameters, which engine mode should be used (e.g. which fuel injection mode is appropriate).

The selection of the correct operating mode at any given time is determined by calculating the current mode of an operating point within the function mode map. To mitigate against rapid switching at mode region boundaries a number of hysteresis points, which are arranged to surround the operating point, are defined and the mode relating to each of these points is additionally determined.

The correct current mode of the operating point is then determined in accordance with criteria (a) and (b).

The appropriate control function of the control unit is then determined from the current mode output from the function mode map and data values output from one or more data maps which relate to various parameters of the engine system (e.g. fuel injection parameters).

Preferably the operating point is surrounded by four hysteresis points. Having more than four points will increase the computational and processing load associated with the invention. Having fewer than four points may result in a system that is not as secure against rapid mode switching.

Preferably, in the present invention, the current mode of the operating point as determined is updated regularly. At each update the previously determined current mode is conveniently set as the existing mode of the operating point. In the event that the engine has just been switched on and there is no previously determined current mode then a default value can be assigned as the existing mode.

Typically one of the first and second engine operating parameters represents engine load and one represents engine speed.

In one embodiment of the present invention the electronic control unit controls a fuel injector and the control function is a waveform for the injector (for example a logic waveform or a current waveform). In such an embodiment the first mode type of the function mode map can conveniently represent a first waveform and the second mode type can represent a second waveform.

The function mode map may comprise more than two mode regions.

The method of the present invention may also include a plurality of further data maps each of which can comprise a two dimensional table of data map points relating to fuel injection parameters.

Preferably the output value determined from the one or more further data maps is determined in dependence upon the first and second operating parameters.

In the present invention the data maps are independent of the function mode map. It may be the case that some engine modes do not require data output from certain regions of the data maps, e.g. in the case of fuel injection modes, one mode may not use pilot injections and so the data tables relating to pilot injection parameters will not require data in the region of the data table corresponding to that particular mode.

However, since the current operating mode selected from the function mode map is dependent upon the modes of the hysteresis points surrounding the current engine operating point, it is possible for the current engine operating point to be located in a first mode (that does not have pilot injections) but for the method of the present invention to output a second mode (which does have pilot injections) as the current operating mode (e.g. because some of the hysteresis points are still located in the second mode whilst the operating point and the remaining hysteresis points have entered the first mode).

In such an instance the engine control unit would require pilot injection data but the data map would be empty of data at that particular operating point. In order to avoid data values dropping off across mode region boundaries in this way the data maps should be calibrated in such a way as to avoid this problem.

For example, in the above case, extra data map output values could be calculated that extend over the region boundary from the second mode region into the first mode region.

Alternatively, the method could further include means for storing the last available data output value derived from the previous mode region and using that value (if required) as the operating point moves into a region in which there are no data output values.

In a further embodiment of the present invention the electronic control unit could control an exhaust gas recirculation unit. In such an embodiment the first mode type of the function mode map could conveniently represent a decision to use exhaust gas recirculation and the second mode type could represent a decision not to use exhaust gas recirculation.

According to a second aspect of the present invention there is provided a controller for controlling operation of an engine control unit suitable for use in an internal combustion engine, the controller including:

a function mode map having a plurality of data map points wherein the function mode map is divided into at least a first type region containing data map points representing mode map output values only of a first mode type and a second type region containing data map points representing mode map output values only of a second mode type;

at least one further data map having a plurality of further data map points, each of the further map points representing a further data map output value;

processor means for determining a current mode for an operating point on an operating path within the function mode map in dependence upon first and second engine operating parameters; determining a mode value for each of a plurality of hysteresis points within the function mode map in dependence upon the first and second engine operating parameters, the hysteresis points being arranged to surround the operating point; and, determining a control function for the electronic control unit based on the current mode of the operating point and at least one further data map output value determined from the at least one further data map wherein the operating point is associated with an existing mode and the processor means determines the current mode of the operating point based on the following criteria:

a) if the mode value of each of the plurality of hysteresis points is different to the existing mode of the operating point then setting the current mode of the operating point as equal to the mode value of the region of the function mode map that the operating point is currently located in;

b) if one or more of the mode values of the hysteresis points is equal to the existing mode of the operating point then maintaining the existing mode value as the current mode of the operating point.

According to a still further aspect of the present invention there is provided a carrier medium for carrying a computer readable code for controlling a processor, computer or other controller to carry out the method of the first aspect of the invention.

In order that the invention may be more readily understood, reference will now be made, by way of example, to the accompanying drawings in which.

Figures 5A, 5B:
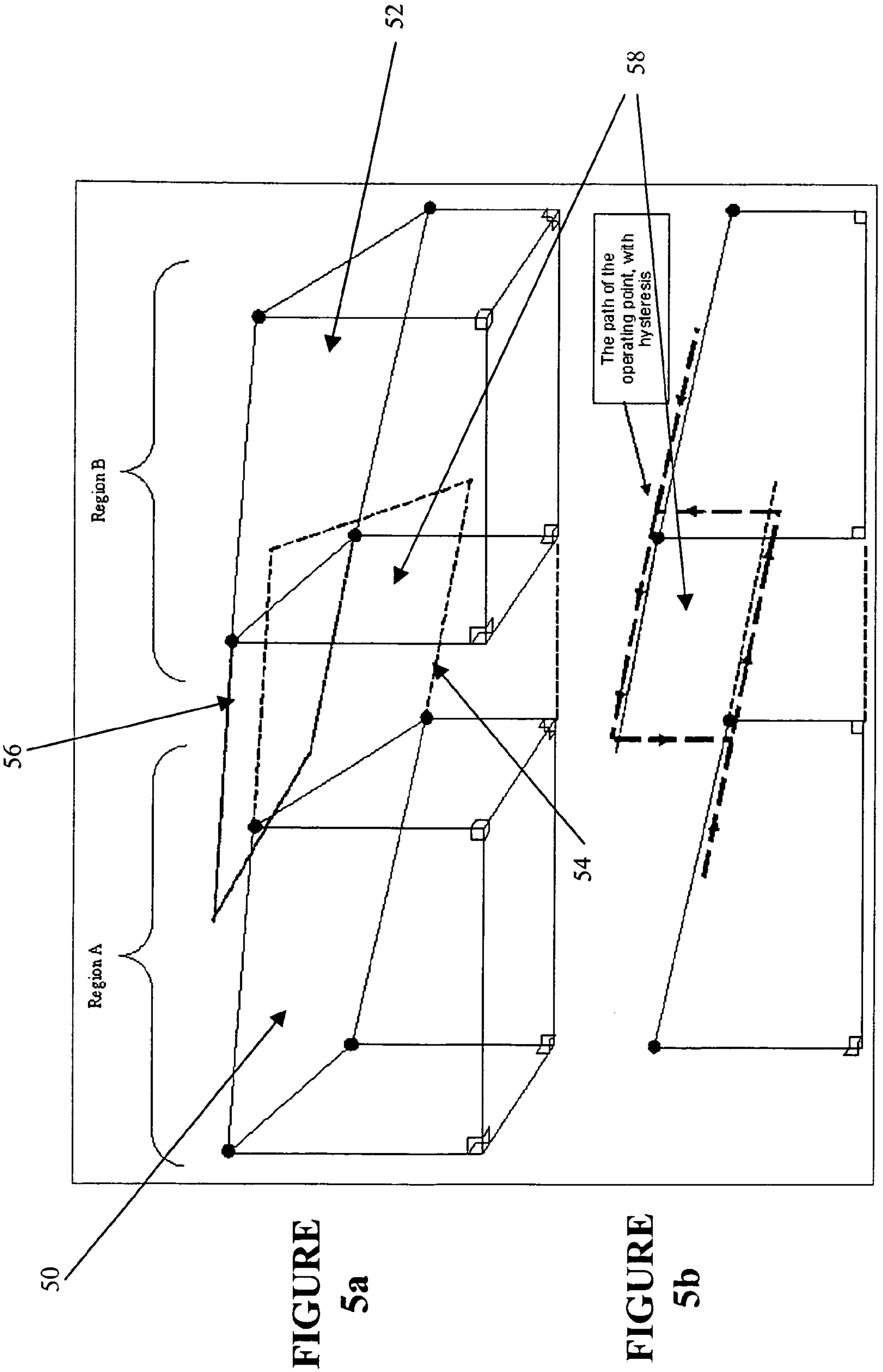
Figure 6:
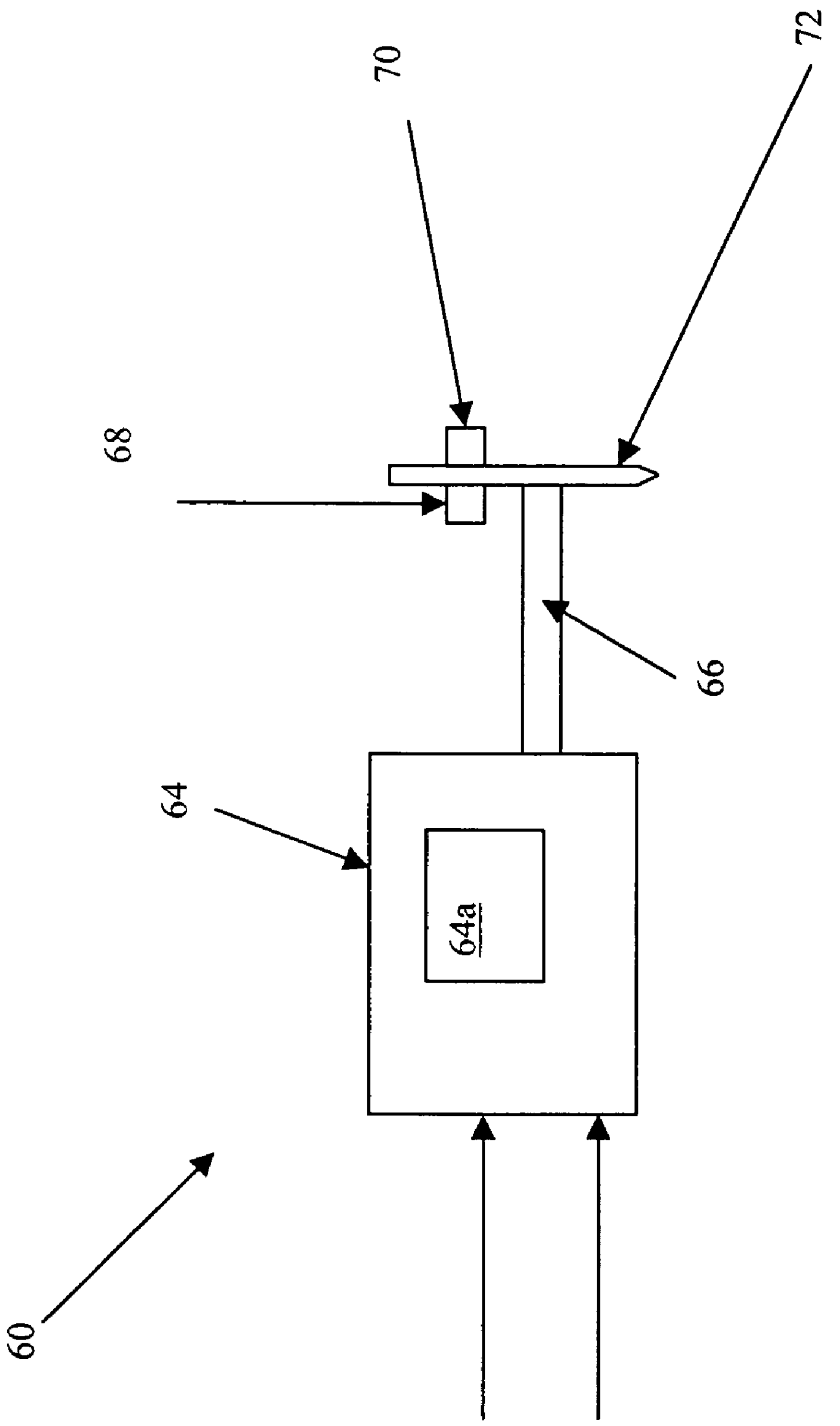
Figure 7:
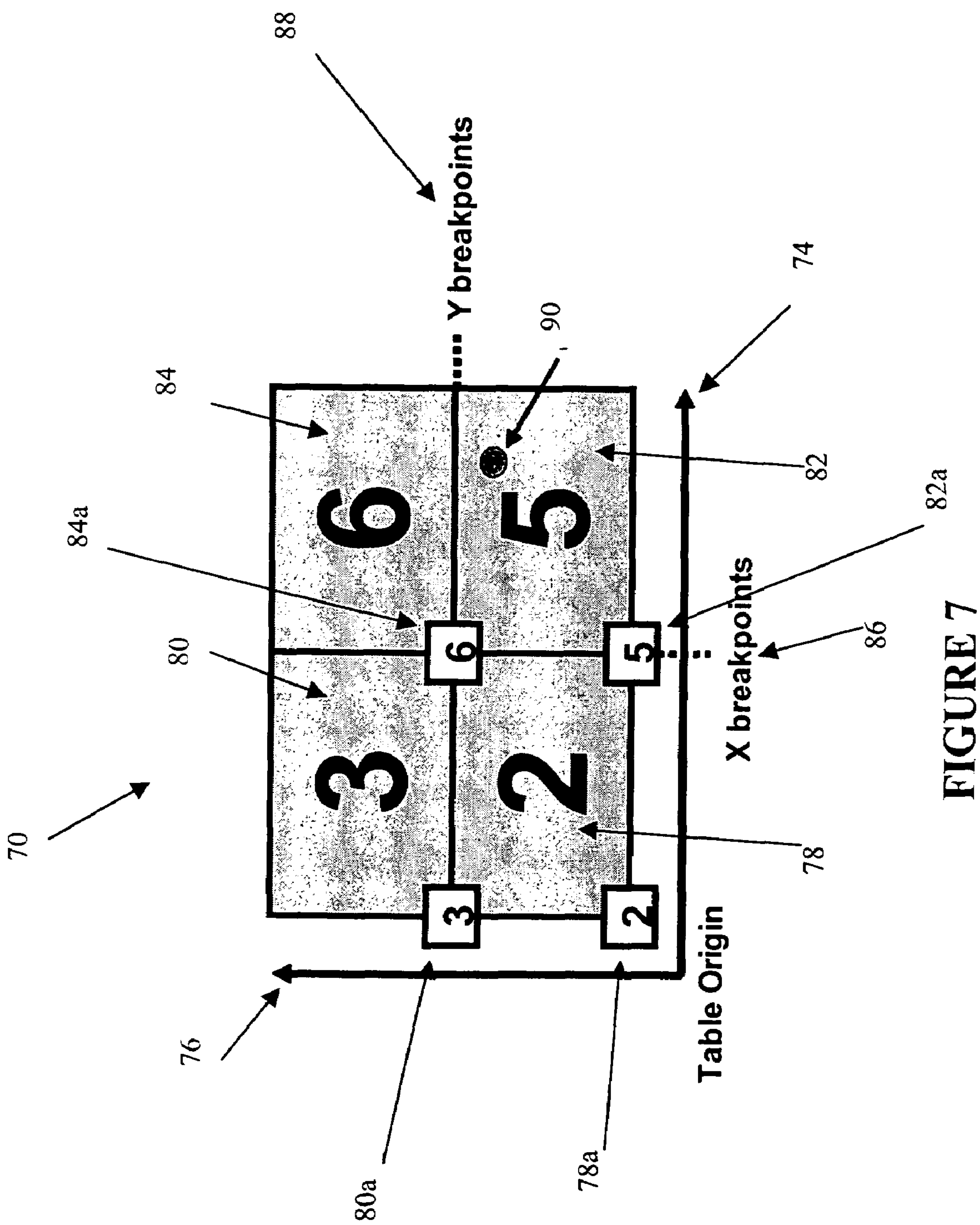
Figure 8:
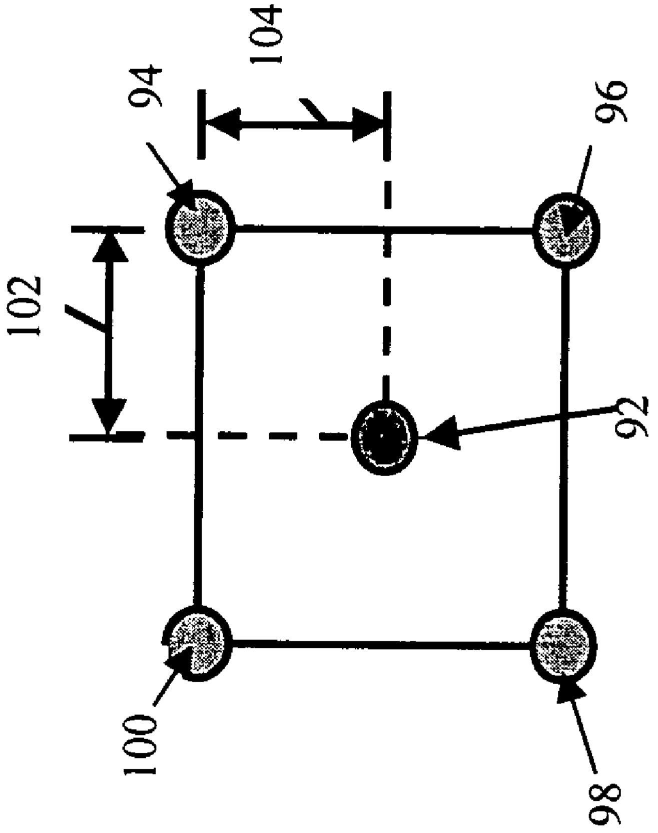
Figure 9:
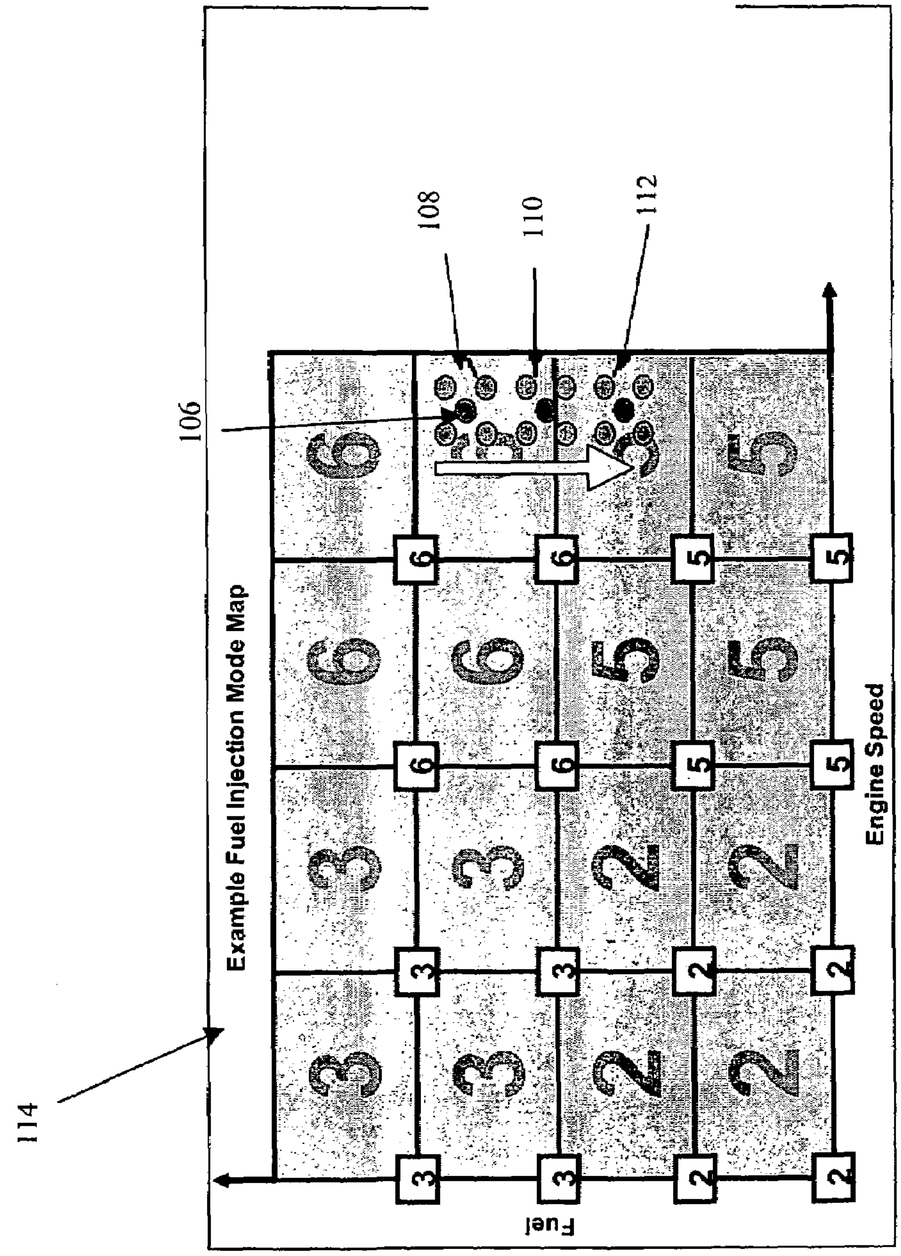
Figure 10:
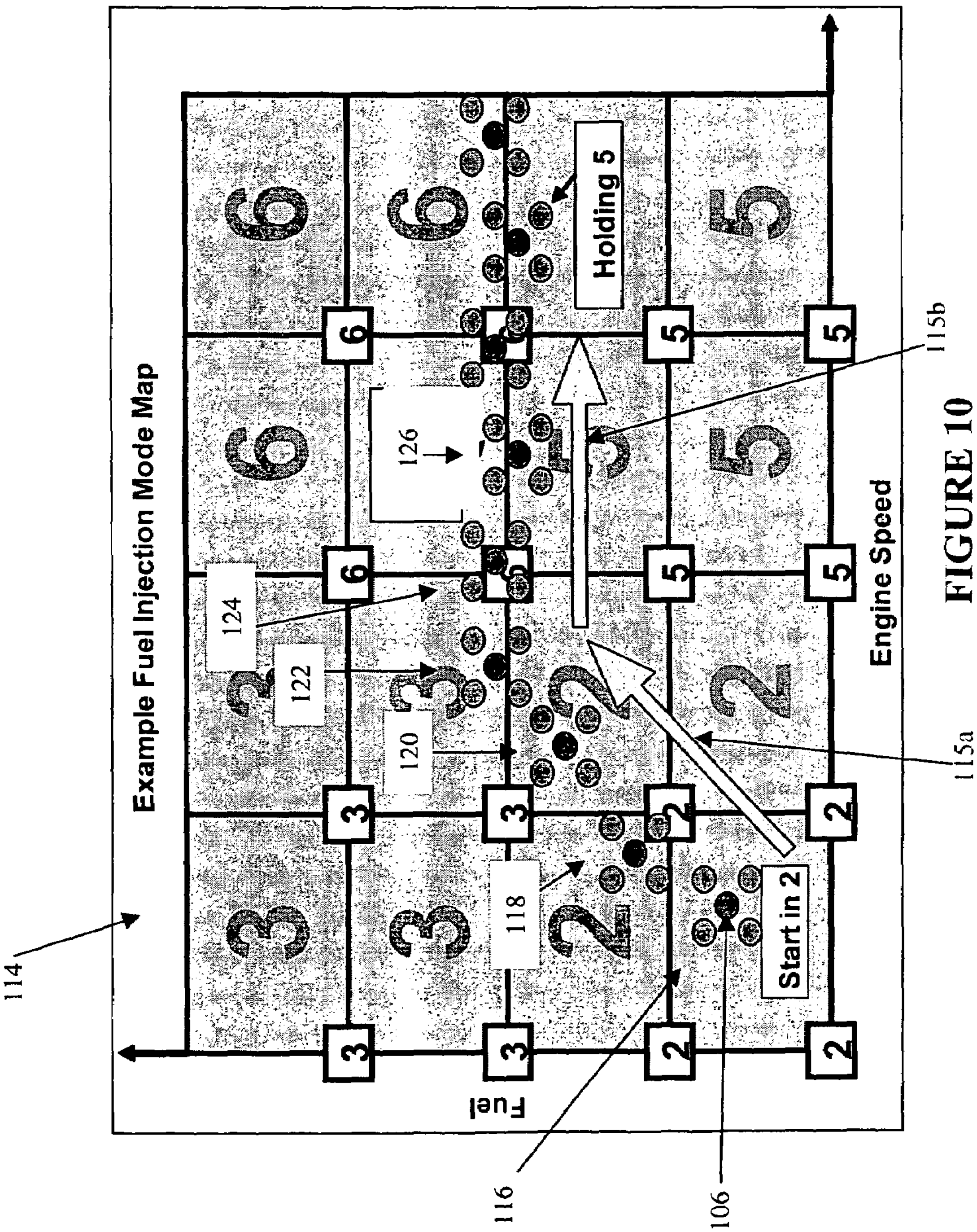
Figure 11:
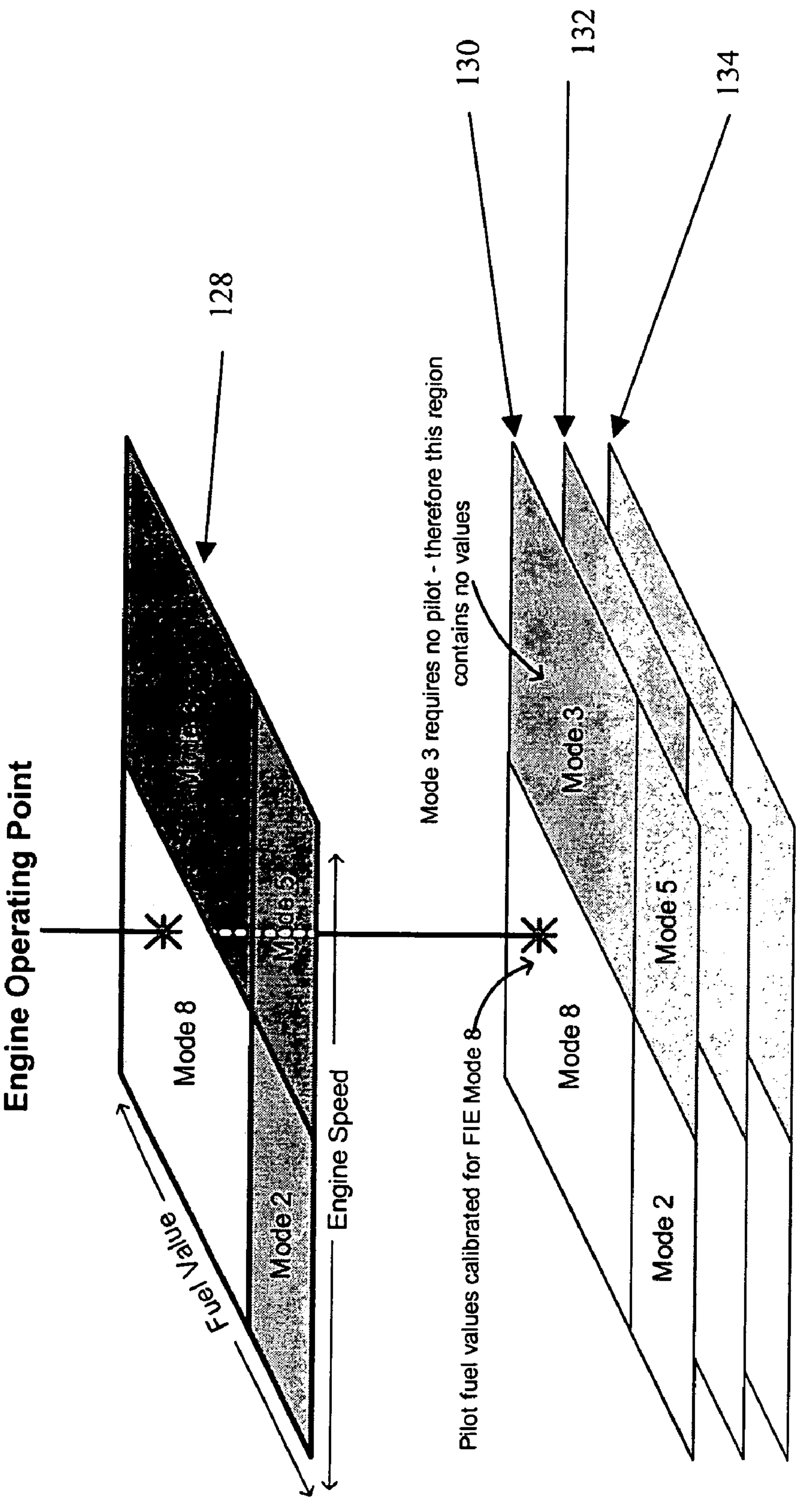
Figure 12A:
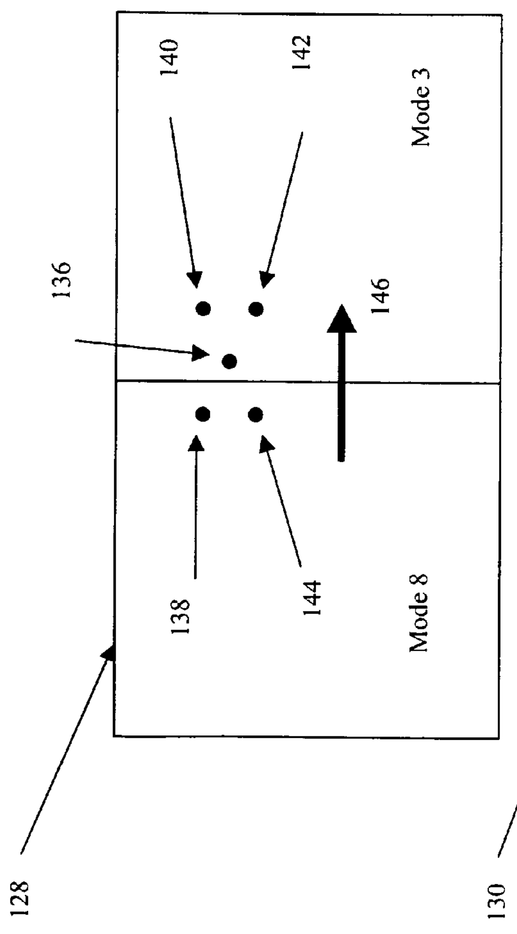
Figure 12B:
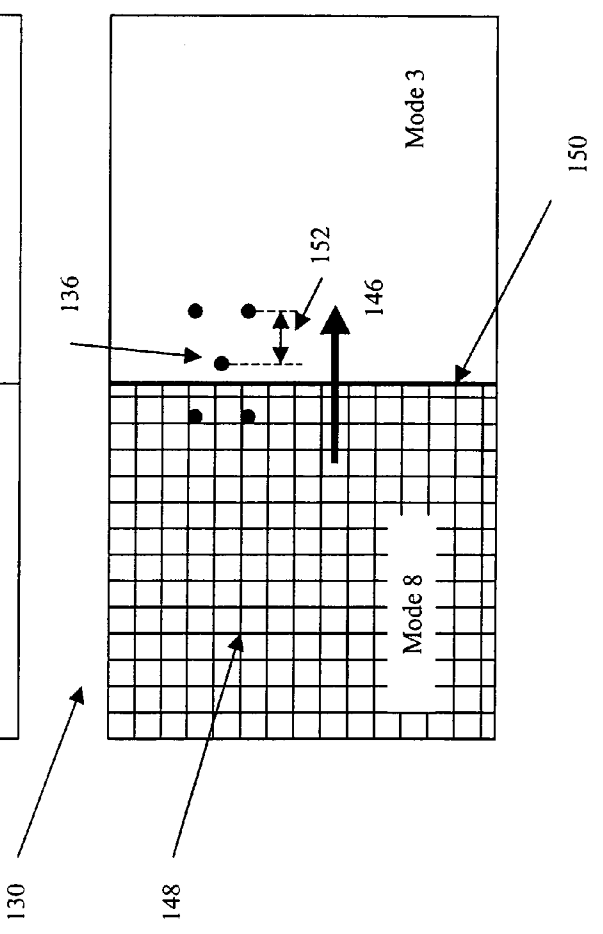
Figure 12C:
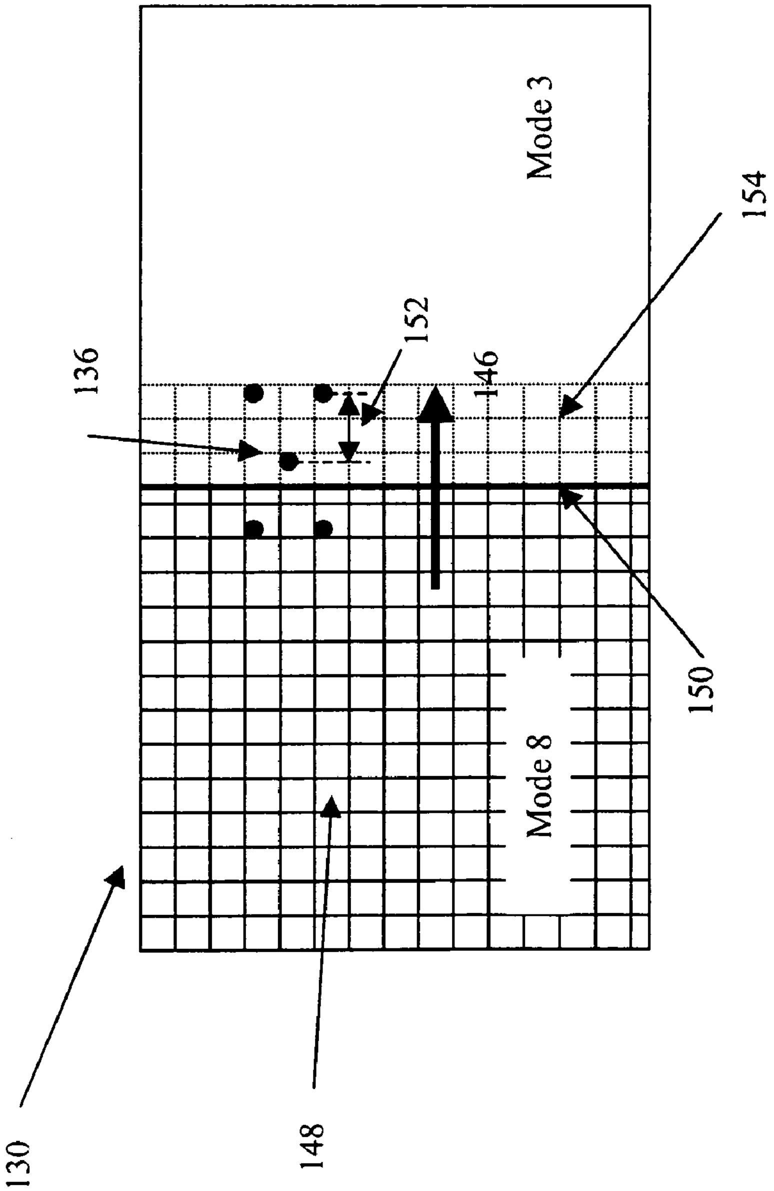

FIGS. 5*a* and 5*b* illustrate diagrammatically the interpolation and extrapolation implemented by the function map of the prior art system FIG. 6 illustrates a controller for controlling operation of an injector of a fuel injection system FIG. 7 illustrates the mode map of the present invention FIG. 8 illustrates the operating point of FIG. 7 in greater detail FIG. 9 illustrates how the mode of the operating point changes for a first operating path FIG. 10 illustrates how the mode of the operating point changes for a second operating path FIG. 11 illustrates the relationship between the mode map of the present invention and fuel injection data maps FIGS. 12*a-c* illustrate the relationship between the function mode map and the data maps in more detail In the following description, the term "engine load" is used as a synonym for "fuel demand" and takes the units of mg fuel. The term engine speed is used in the normal context and takes the units of rpm. Where different combinations of injections or part injections are used in each injection cycle, such combinations are referred to as injection cycle "modes". The term "operating condition" is used to define a given combination of engine speed and load and the term "operating point" is used to define the instantaneous operating condition of the engine at any given time.

Figure 1:
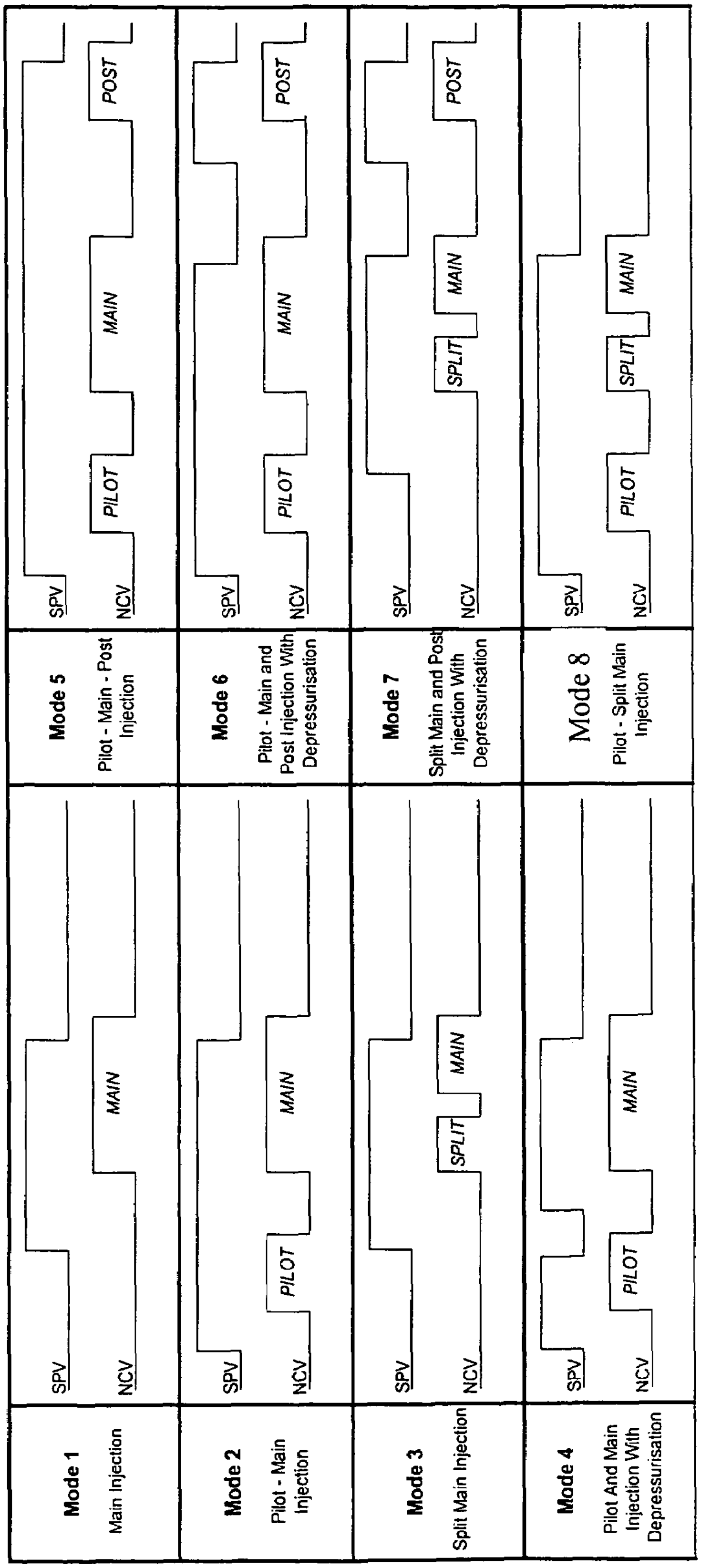
FIG. 1 shows examples of logic pulses for different fuel injection modes

FIG. 1 shows various logic pulses for injection pulse structures, or "modes", for a fuel injection controller. Each of the 8 modes shows both the needle control valve (NCV) and the spill control valve (SPV) logic structures. The needle control valve structure defines when fuel is injected and the spill control valve logic structure details when the spill valve is opened and closed (which therefore affects the pressure within the system).

The injection logic pulses fall into four different operating pulse structures, namely: Main Injection—the main torque producing injection pulse; Pilot Injection—a small injection scheduled ahead of the main injection; Split Injection—the main torque producing pulse is replaced with two separate injections; Post Injection—a small injection producing little torque scheduled after the main pulse.

Figure 2:
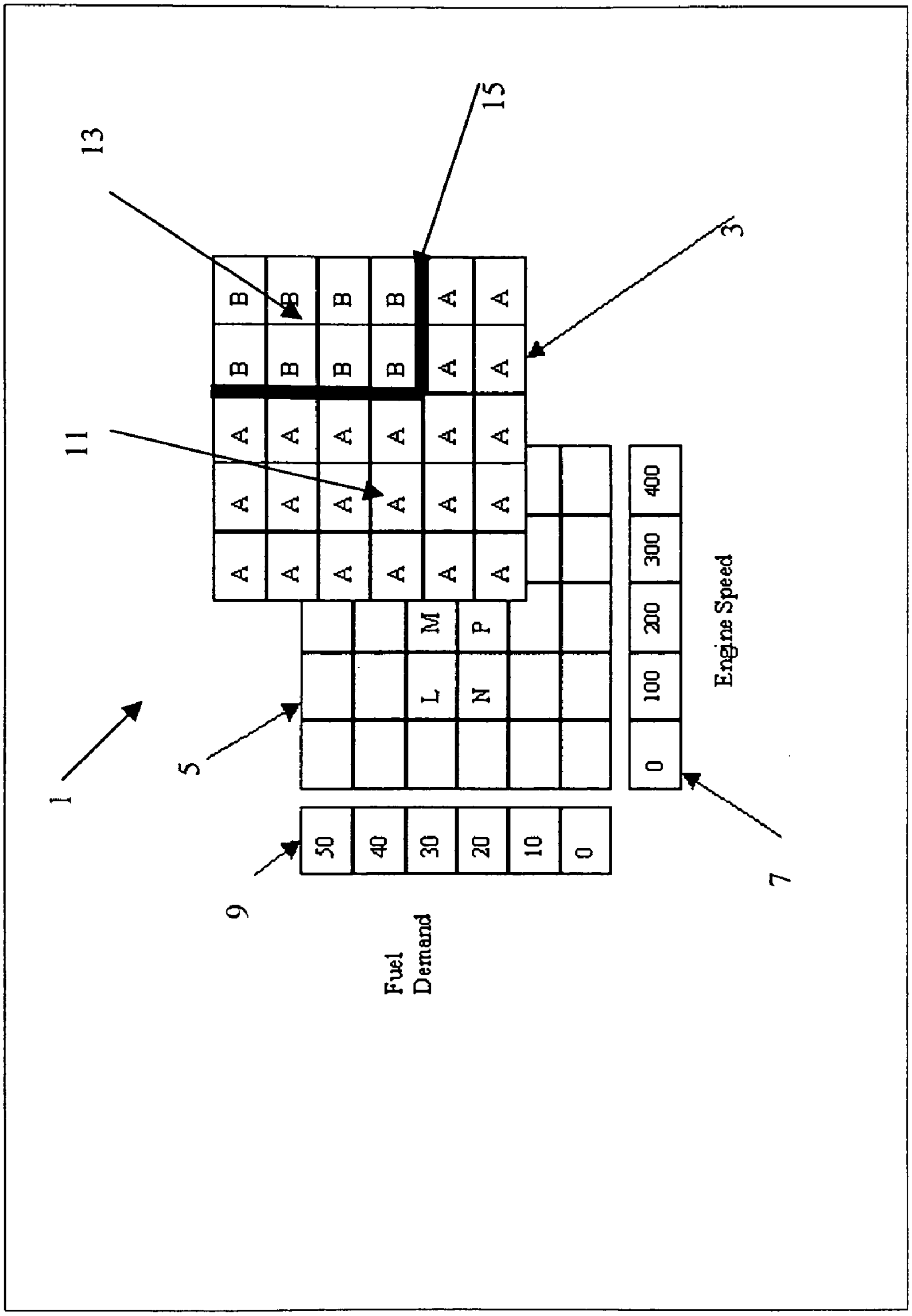
FIG. 2 illustrates a function map according to a prior art system along with an associated two dimensional data table

FIG. 2 shows a "function map" 1 according to the prior art (as disclosed in the Applicant's co-pending application EP1344921). The Function map includes a main algorithm and data map, the "region" map 3, in the form of a two-dimensional data table. Associated with this region map is a further two dimensional table 5 containing output data values as a function of engine speed 7 and fuel demand 9.

The region map shown in FIG. 2 is divided into two general regions, a first data map region 11 in which all of the data map points have an A cycle value and a second data map region 13 in which all of the data map points have a B cycle value. Although the Figure shows only two injection modes ("A" and "B") it is understood that more than two cycle types are possible.

It is noted that the table axes (7, 9) are common to both the region map 3 and the data table 5. The hysteresis of the region map refers to the area of the map separating the two injection modes, A and B. The hysteresis is determined in the prior art method by the table axes and is defined by the distance between the table axes breakpoints and the region intersections. For example, if the function map is mode "A" at a column value of 100 and mode "B" at the next column value of 200, then the hysteresis is 100.

The hysteresis zone of the region map of FIG. 2 is shown by the bold line 15.

The Function map and method of the prior art system determines the region (/mode) in which any given operating point is located by determining the four region values that surround the current operating point.

Figure 3:
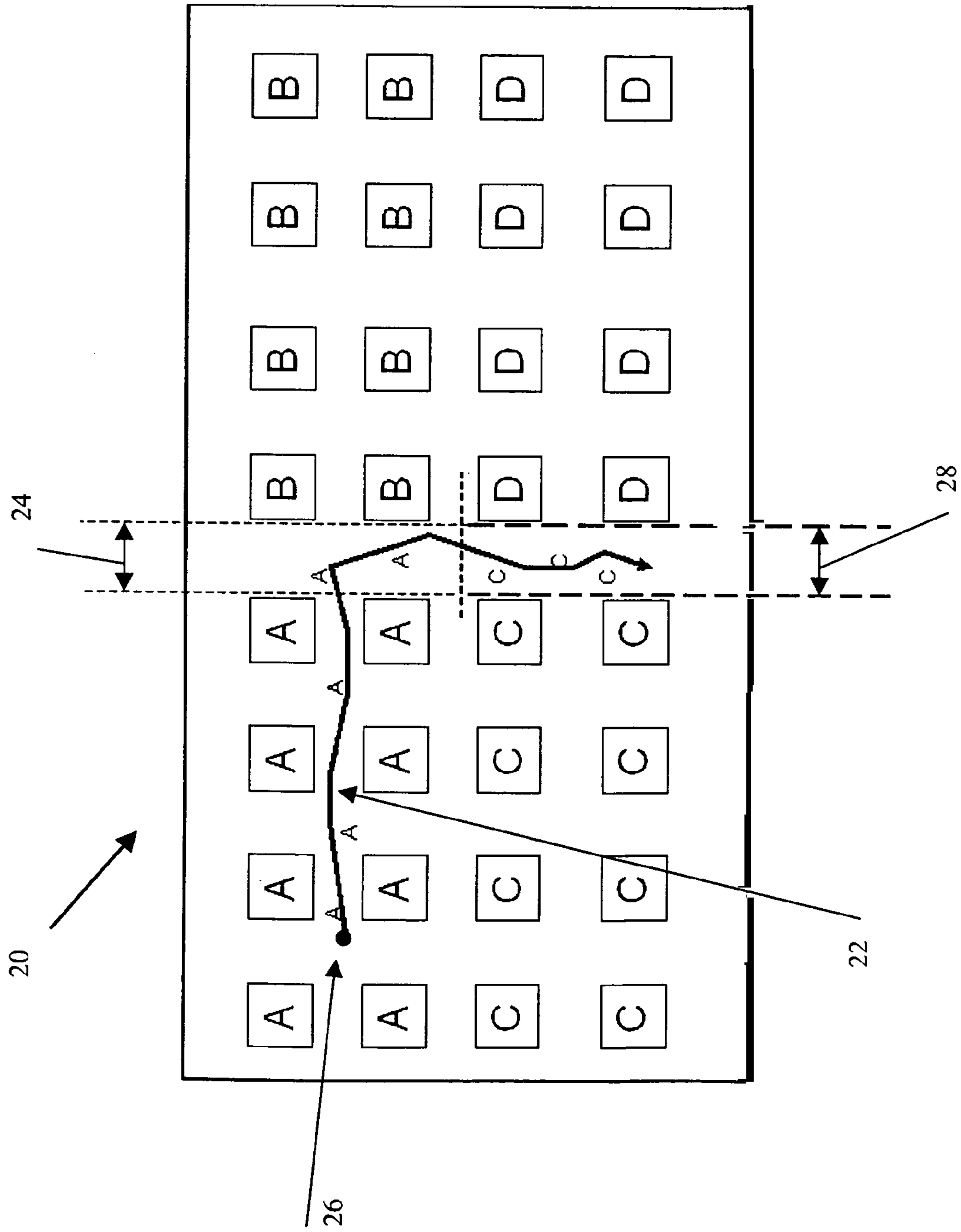
FIG. 3 illustrates an engine operating path with respect to the function map of FIG. 2

The region map 20 of FIG. 3 comprises four different regions, A, B, C and D which represent different injection modes. The Figure illustrates mode determination for an operating point that follows an operating path 22 that starts in region A before moving into a hysteresis region 24 between regions A and B.

At the start of the operating path (denoted by point 26) the region values surrounding the current operating point are all the same (A, A, A, A) and so the mode of the operating point is A. As the operating point enters the hysteresis region 24 between regions A and B the region values surrounding the operating point are different (A, A, B, B). The region for the operating point is therefore held at the original value (A).

The operating path then takes the operating point into the hysteresis region 28 between regions C and D. Now all of the region values surrounding the operating point (C, C, D, D) are different to the old region. The system chooses to update the operating point region to the region value closest (geographically) to the original region. In this case the region is C because region C is closer to region A than region D.

The output of the function map (1, 20) of the prior art system is a data value or values that are derived from the data map (5 in FIG. 2, not shown in FIG. 3). Output data is determined in one of two ways depending on the location of the operating point. If the operating point is located entirely within a given region (i.e. if the surrounding regions are all the same) then the data map output is interpolated from the current data map region data.

However, if the operating point is between regions in a hysteresis area then the data map output is extrapolated from the current region data.

Figure 4:
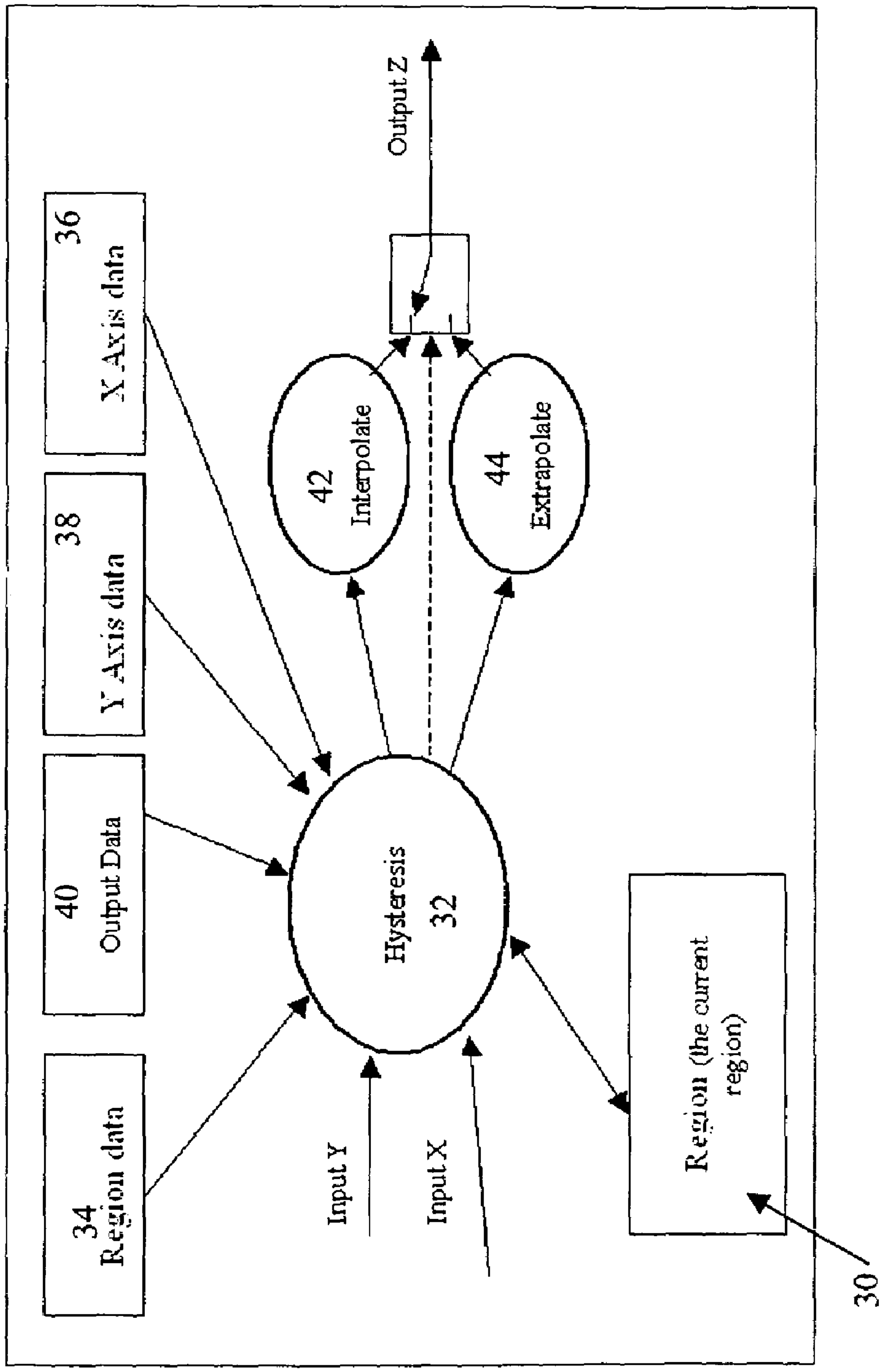
FIG. 4 illustrates the various inputs and outputs of the function map of FIGS. 2 and 3

The various stages in deriving an output value using the prior art system are therefore quite involved. FIG. 4 illustrates the various data values that are required and the various calculations that take place.

At a given point, the engine speed and fuel demand values are input as inputs X and Y. The system then derives the relevant region 30 taking into account any hysteresis factors 32. The region data determines the X and Y axis data (36, 38) that is required by the system in order to generate an output data value 40. Depending on the location of the operating point either an interpolation 42 or extrapolation 44 step is performed in order to derive a final output value Z.

FIG. 5*a* diagrammatically illustrates the concept of the hysteresis region. The Figure shows two adjacent elements from the region map of FIG. 3, an "A" region element and a "B" region element. The surfaces of each region (50, 52) have been extended (extrapolated) such that the extended parts (54, 56) of each region overlap into the adjacent region. The overlapping volume 58 is equivalent to the hysteresis region of FIG. 3.

FIG. 5*b* shows the front surface of FIG. 5*a* in 2D for clarity.

It is noted in the prior art system that the function map always uses output data from the current region in order to determine the output value. For example, if the current operating region is determined to be region A then the output data will come from a section calibrated for region A. The data may be extrapolated between regions (if the operating point is within a hysteresis region) but it is always extrapolated from the relevant region A data.

In the function map approach described above, the system hysteresis is set by the table axes. Any change to the hysteresis of the region map therefore requires all the associated data tables to be re-calibrated as well. This is potentially a lengthy and complicated procedure.

Furthermore, the function map approach requires data to be extrapolated within the hysteresis regions. This is undesirable since rapidly varying data values in the data tables could potentially lead to erroneous data values being returned by the extrapolation process.

Referring to FIG. 6, a fuel injection system 60 typically comprises one or more injectors 62 (one of which is shown in this example) controlled by means of an engine management system 64 or controller including a computer or processor 64*a*. The controller is arranged to generate an injector control function 66, typically in the form of an electrical current, which is applied to the injector to control the movement of an injector valve needle (not shown). In a unit injector, for example, the control function takes the form of a current waveform that is applied to an electromagnetic actuator. In the example shown in FIG. 6 the injector comprises two actuators (68, 70), one of which controls the needle control valve (which controls injection of fuel) and the other which controls the spill control valve (which tends to control the pressure within the injector).

The mode map according to the present invention is illustrated in FIG. 7. It is noted that although the following description relates to fuel injection modes the map and associated method can be applied to any discrete data set, e.g. the method can be applied to exhaust gas recirculation as described above.

In the present invention mode determination is made with reference to a function mode map 72 having axes of engine speed on the x-axis 74 and fuel on the y-axis 76. FIG. 7 shows a mode map comprising four distinct regions (78, 80, 82, 84) each of which represents a different engine control mode. In the present Figure the four modes are "mode 2", "mode 3", "mode 5" and "mode 6". X and Y breakpoints (86, 88) define the boundaries between modes in the Figure. An operating point 90 is shown located in mode 5.

In FIG. 7 the mode value of any of the large cells or regions (78, 80, 82, 84) can be derived from the value of the small box (78*a*, 80*a*, 82*a*, 84*a*) in its bottom left hand corner. The only output possible from the function mode map is a discrete mode, e.g. a discrete fuel injection mode. For example, if an operating point 90 is halfway between modes 4 and 5 the function will not return a value of 4.5 but 4.

The function mode map simply takes the last index point below the current operating condition, in both the x- and y-axis directions. For example, in the fuel direction, if an engine is being operated at a fuel of 75 mg/str and the breakpoints either side are 50mg/str and 100 mg/str, the function will select the 50 mg/str index. The same principle is used in the engine speed axes. As such, an operating point in between breakpoints will always evaluate to the bottom left hand corner value.

FIG. 8 illustrates how the present invention protects against rapid mode switching. In FIG. 8 the operating point (or base point) 92 has been surrounded by four additional (corner or hysteresis) points (94, 96, 98, 100). The distance of the corner points from the operating point defines the fuel and engine speed hysteresis. In the present case the horizontal displacement 102 of the corner point defines the engine speed hysteresis and the vertical displacement 104 defines the fuel hysteresis.

It is therefore noted that hysteresis in the present invention is defined relative to the operating point and is not linked to the table axes.

The present invention seeks to provide a method for controlling operation of an electronic control unit (for controlling, for example, a fuel injector) such that the control unit can switch between different engine modes (e.g. fuel injection modes) as required. The electronic control unit is controlled by assessing the current mode of an operating point within the function mode map. The current mode is determined at any given time in relation to a previously calculated mode (an "existing mode" of the operating point) and the modes of each of the corner points.

In order to determine the current mode of the operating point the present invention assesses the mode of each of the corner points in relation to the existing mode value of the operating point. If each and every corner point has a mode that is different to the existing mode then the current mode value of the base point requires updating. If, however, the mode of one or more of the corner points is the same as the existing mode of the operating point then the current mode value is held unchanged (as equal to the existing mode value).

When the operating mode updates it updates the current mode value to the mode region that the operating point is currently located in.

It is noted that although the corner points all need to differ from the existing mode of the operating point for the mode to be updated they do not need to be equal to each other, e.g. if the existing mode of the operating point is 4 then the system will update if the corner points evaluate to (5, 5, 5, 5) or (5, 5, 6, 6) or any combination of 4 values that do not include mode 4.

The existing mode value will usually be derived from the previous evaluation step. However, on system start up a default value may be assigned as the existing mode value.

FIG. 9 shows an example of a mode transition. In the Figure an operating point 106 is shown surrounded by four corner points at three different mode evaluation positions (108, 110, 112) within a function mode map 114. For the sake of clarity only the operating point at the first evaluation position 108 has been assigned a reference numeral. The mode map 114 depicted in FIG. 9 is a 16 cell map (in a 4×4 configuration) having four different regions or modes (modes "2", "3", "5" and "6").

At the first position 108 the operating point 106 and four corner points are all located in region 6 and therefore the operating point has a current mode of 6.

The operating point then moves to a second position 110. At this second position the existing mode value for the operating point is mode 6 (i.e. the existing mode at the second position is equal to the current mode as calculated at the first position). It can be seen that two of the corner points have now entered region 5. The operating point and two of the corner points however are still in region 6. Under the logic of the control method of the present invention the current mode of the operating point is held at mode 6. This is because only two of the corners have left the old mode.

The operating point then moves to a third position 112. The existing mode of the operating point is mode 6 (existing mode of third position=current mode of second position). However, in the third position all four corner points have left the old mode and they now all evaluate to mode 5. Since none of the corner points evaluate to the existing mode of the operating point, the current mode of the operating point is set (updated) to mode 5.

As can be seen from FIG. 9 it is only when all corners totally leave a mode that an update is triggered.

FIG. 10 shows the same mode map 114 as FIG. 9 (Like numerals are used between FIGS. 9 and 10 to denote like features).

In this case however the operating path (denoted by arrows 115*a* and 115*b*) is different. The operating point 106 initially starts in the bottom left hand corner of the map in mode 2 (it is noted that this represents the system start up and so mode 2 is actually the default mode which is supplied as the existing mode in lieu of a previous evaluation step being available).

The operating point 106 is shown to travel in a diagonal direction 115*a* (towards the top right hand corner of the map) until it reaches region mode 3. At this point the operating path changes direction and the operating point travels in direction 115*b* along the breakpoints between modes 2 and 3 and then later between modes 5 and 6.

Travelling along a breakpoint is a special case of operation. In such a case it is desirable that the mode update to one of the modes close to the current operating point rather than hold an older, more inappropriate value.

FIG. 10 shows how the logic of the present invention deals with this special case of operation. Turning to the Figure again it is noted that the operating point 106 initially starts with mode 2.

The operating point holds mode 2 at each of the next four stages (118, 120, 122, 124). It is noted that although two corner points enter mode 3 at position 122 the mode of the operating point does not update to mode 3 since the system logic requires all four points to leave a mode before updating. It is further noted that mode 2 is held as the operating point mode even at position 124 in which only a single corner point evaluates to mode 2.

From position 124 onwards the operating point is travelling along the mode 5/mode 6 breakpoint. At position 126 the operating point updates its mode to mode 5. This is because upon reaching position 126 the existing mode of the operating point is mode 2. The four corner points however evaluate to (6, 6, 5, 5), i.e. they are all different to the existing mode value.

The operating point mode therefore requires updating in accordance with the method of the present invention. Since the operating point is by this point in time located in region 5 it updates to mode 5. Mode 5 is then held for the remainder of the operating path shown as all corner points never totally leave mode 5.

FIG. 11 shows the relationship between the function mode map of the present invention and conventional data tables/maps. The Figure shows a function mode map 128 and three regular 2D maps (130, 132, 134) that sit below the mode map.

The mode map 128 is used to determine the correct injection mode based on the engine speed and fuel demand. The 2D maps (130, 132, 134) beneath the mode map then detail the various features of the injection mode, e.g. how much fuel should be contained in the pilot injection, where the pilot injection should be located, what the nozzle operating pressure should be for the pilot should be etc.

It is noted that the function mode map of the present invention differs from the function map of the prior art in that the data maps associated with a given mode or region are not linked to the mode map. The data maps are instead totally independent of the mode map and their output is simply a function of the current operating point.

The 2D maps are defined and calibrated accordingly by a user with knowledge of the breakpoints and intersections of the mode map.

Returning to FIG. 11 it is noted that 2D map 130 represents the amount of fuel required in a pilot injection in dependence upon engine speed and load. As can be seen from FIG. 1 not all modes will have a pilot injection and so this 2D map may have no values in certain areas, these areas corresponding to certain modes in the function mode map 128 above.

For example, in FIG. 1 mode 8 has a pilot injection but mode 3 does not have a pilot injection. In FIG. 11, therefore the data table for the 2D map 130 in the mode 3 region does not require any data values.

It is noted however that since the current operating mode selected from the function mode map is dependent upon the modes of the hysteresis points surrounding the current engine operating point, it is possible for the current engine operating point to be located in mode 3 (no pilot injection) but for the method of the present invention to output "mode 8" as the current operating mode (e.g. because some of the hysteresis points are still located in mode 8 whilst the operating point and the remaining hysteresis points have already entered mode 3).

This scenario is illustrated in FIGS. 12*a* and 12*b*. FIG. 12*a* essentially corresponds to a plan view of a section of the function mode map of FIG. 11. FIG. 12*b* is a plan view of the 2D data map of FIG. 11. For the sake of clarity the 2D data map has been offset from the function mode map. It is noted however that the function mode map (FIG. 12*a*) should be located on top of the 2D data map (FIG. 12*b*).

FIG. 12*a* shows mode regions 3 and 8 of the function mode map 128. An operating point 136 is shown in mode 3. The operating point is surrounded by four corner points (138, 140, 142, 144). The direction of the operating path is shown by arrow 146.

It can be seen that corner points 138 and 144 have not yet left region mode 8. In accordance with the present invention therefore the current mode of the operating point will be calculated as mode 8. Mode 8 requires a pilot injection.

On the 2D data table 130 however the output value is determined solely from the location of the operating point 136 (since the data tables and function mode map are independent). The 2D data map shown in FIG. 12*b* has output values 148 in mode 8 but has no pilot fuel values in mode 3. The zone/region boundary is marked as feature 150. The hysteresis 152 of the system along the engine speed axis is also shown.

Therefore this scenario would present an additional switching problem in that the engine control unit would be in a mode requiring a pilot injection but the 2D data map governing the pilot injection parameters would be empty of data at the location of the current operating point.

In order to overcome this potential problem the 2D data maps should be calibrated such that data values do not drop off to zero as a region breakpoint is crossed. This could be achieved by calibrating the 2D data tables such that the data extends across region boundaries at least as far as the equivalent hysteresis zone as defined by the corner points around the operating point. This would ensure that even if the current operating mode is maintained at a value from a previous mode region the 2D data maps below output a data value. This is illustrated in FIG. 12*c*. The hysteresis of the system across the region boundary 150 is governed by the horizontal separation 152 of the corner points from the operating point. In order to avoid data values in table 130 dropping off the data table has been calibrated such that the data now extends into the mode 3 region—as illustrated by data values 154.

It is possible that the hysteresis of the system could be altered. In order to avoid any data value problems in the event that the hysteresis is changed the data values could be extended in the manner shown in FIG. 12*c* completely across regions.

As an alternative to the above, the engine control unit could store and use the last data value available from the previous mode region as the operating point crosses the boundary 150.

The skilled person will appreciate that although the above description relates to a function mode map for control of fuel injection modes the method of the present invention can be applied to control any type of engine operating mode. For example, instead of controlling injection mode (1-8) as a function of speed and fuel, it could control whether or not to use exhaust gas recirculation (EGR).

EGR changes the operating 'mode' of the engine but does so by affecting the air intake and not the fuel. So, the above described function mode map could be used to control whether or not to use EGR. "Mode 1" could be made equal to using EGR, and mode 0 could equate to no EGR. A function mode style map with sections of 1's for where EGR was required and 0's where EGR was not required could then be constructed. This mode map would avoid rapid switching between EGR "on" and "off" states. In this example the 2D data maps associated with the function mode map could contain data relating to the EGR, for example %EGR fraction (i.e. how much of the intake air do you want to be exhaust gas).

The invention claimed is:

1. A method for controlling operation of an electronic control unit for use in an internal combustion engine, the electronic control unit being used to control different engine modes, the method comprising:

providing a function mode map having a plurality of data map points wherein the function mode map is divided into at least a first type region containing data map points representing mode map output values only of a first mode type and a second type region containing data map points representing mode map output values only of a second mode type;

and providing at least one further data map having a plurality of further data map points, each of the further map points representing a further data map output value;

determining a current mode for an operating point on an operating path within the function mode map in dependence upon first and second engine operating parameters;

determining a mode value for each of a plurality of hysteresis points within the function mode map in dependence upon the first and second engine operating parameters, the hysteresis points being arranged to surround the operating point; and determining a control function for the electronic control unit based on the current mode of the operating point and at least one further data map output value determined from the at least one further data map;

wherein the operating point is associated with an existing mode and the current mode of the operating point is determined based on the following criteria:

a) if the mode value of each of the plurality of hysteresis points is different to the existing mode of the operating point then setting the current mode of the operating point as equal to the mode value of the region of the function mode map that the operating point is currently located in;

b) if one or more of the mode values of the hysteresis points is equal to the existing mode of the operating point then maintaining the existing mode value as the current mode of the operating point.

2. A method as claimed in claim 1 wherein the operating point is surrounded by four hysteresis points.

3. A method as claimed in claim 1 further comprising repeatedly updating the current mode of the operating point in order to update the control function of the controller wherein the current mode of the operating point determined at a first time is set as the existing mode of the operating point for a second, sequential time.

4. A method as claimed in claim 1 wherein a default mode is set as the existing mode of the operating point.

5. A method as claimed in claim 1 wherein one of the first or second engine operating parameters represents engine load.

6. A method as claimed in claim 1 wherein one of the first or second engine operating parameters represents engine speed.

7. A method as claimed in claim 1 wherein the control function is a waveform for a fuel injector.

8. A method as claimed in claim 7 wherein the first mode type of the function mode map represents a first waveform and the second mode type of the function mode map represents a second waveform.

9. A method as claimed in claims 7 wherein there are a plurality of further data maps each of the plurality of further data maps comprising a two dimensional table of data map points relating to fuel injection parameters.

10. A method as claimed in claim 1 wherein the at least one further data map output value is determined from the at least one further data map in dependence upon the first and second engine operating parameters.

11. A method as claimed in claim 10 wherein the data points of the at least one further data map are independent of the function mode map.

12. A method as claimed in claim 10 wherein the at least one further data map is arranged to have data map output values for all function mode map output values.

13. A method as claimed in claim 10 further including means for storing recent data map output values.

14. A method as claimed in claim 1 wherein the control function controls an exhaust gas recirculation unit.

15. A method as claimed in claim 14 wherein the first mode type of the function mode map represents a decision to use exhaust gas recirculation and the second mode type of the function mode map represents a decision not to use exhaust gas recirculation.

16. A controller for controlling operation of an engine control unit suitable for use in an internal combustion engine, the controller comprising:

a function mode map having a plurality of data map points wherein the function mode map is divided into at least a first type region containing data map points representing mode map output values only of a first mode type and a second type region containing data map points representing mode map output values only of a second mode type;

at least one further data map having a plurality of further data map points, each of the further map points representing a further data map output value;

processor means for determining a current mode for an operating point on an operating path within the function mode map in dependence upon first and second engine operating parameters; determining a mode value for each of a plurality of hysteresis points within the function mode map in dependence upon the first and second engine operating parameters, the hysteresis points being arranged to surround the operating point; and, determining a control function for the electronic control unit based on the current mode of the operating point and at least one further data map output value determined from the at least one further data map wherein the operating point is associated with an existing mode and the processor means determines the current mode of the operating point based on the following criteria:

a) if the mode value of each of the plurality of hysteresis points is different to the existing mode of the operating point then setting the current mode of the operating point as equal to the mode value of the region of the function mode map that the operating point is currently located in;

b) if one or more of the made values of the hysteresis points is equal to the existing mode of the operating point then maintaining the existing mode value as the current mode of the operating point.

17. A carrier medium for carrying a computer readable code for controlling a processor or computer to carry out the steps of:

providing a function mode map having a plurality of data map points wherein the function mode map is divided into at least a first type region containing data map points representing mode map output values only of a first mode type and a second type region containing data map points representing mode map output values only of a second mode type;

and providing at least one further data map having a plurality of further data map points, each of the further map points representing a further data map output value;

determining a current mode for an operating point on an operating path within the function mode map in dependence upon first and second engine operating parameters;

determining a mode value for each of a plurality of hysteresis points within the function mode map in dependence upon the first and second engine operating parameters, the hysteresis points being arranged to surround the operating point; and determining a control function for the electronic control unit based on the current mode of the operating point and at least one further data map output value determined from the at least one further data map;

wherein the operating point is associated with an existing mode and the current mode of the operating point is determined based on the following criteria:

a) if the mode value of each of the plurality of hysteresis points is different to the existing mode of the operating point then setting the current mode of the operating point as equal to the mode value of the region of the function mode map that the operating point is currently located in;

b) if one or more of the mode values of the hysteresis points is equal to the existing mode of the operating point then maintaining the existing mode value as the current mode of the operating point.

18. A method for controlling operation of an electronic control unit for use in an internal combustion engine, the electronic control unit being used to control different engine modes, the method comprising:

providing a function mode map having a plurality of data map points wherein the function mode map is divided into at least a first type region containing data map points representing mode map output values only of a first mode type and a second type region containing data map points representing mode map output values only of a second mode type;

and providing at least one further data map having a plurality of further data map points, each of the further map points representing a further data map output value;

determining a current mode for an operating point on an operating path within the function mode map in dependence upon first and second engine operating parameters;

determining a mode value for each of a plurality of hysteresis points within the function mode map in dependence upon the first and second engine operating parameters, the hysteresis points being arranged to surround the operating point;

and determining a control function for the electronic control unit based on the current mode of the operating point and at least one further data map output value determined from the at least one further data map;

wherein the operating point is associated with an existing mode and the current mode of the operating point is determined based on the following criteria:

a) if the mode value of each of the plurality of hysteresis points is different to the existing mode of the operating point then setting the current mode of the operating point as equal to the mode value of the region of the function mode map that the operating point is currently located in;

b) if one or more of the mode values of the hysteresis points is equal to the existing mode of the operating point then maintaining the existing mode value as the current mode of the operating point;

wherein one of the first or second engine operating parameters represents engine load, one of the first or second engine operating parameters represents engine speed and the control function is a waveform for a fuel injector.

19. A method as claimed in claim 18 further comprising repeatedly updating the current mode of the operating point in order to update the control function of the controller wherein the current mode of the operating point determined at a first time is set as the existing mode of the operating point for a second, sequential time.

20. A method as claimed in claim 18 wherein the first mode type of the function mode map represents a first waveform and the second mode type of the function mode map represents a second waveform.

21. A method as claimed in claims 18 wherein there are a plurality of further data maps each of the plurality of further data maps comprising a two dimensional table of data map points relating to fuel injection parameters.

* * * * *